(12) United States Patent
Zhou (10) Patent No.: US 8,862,655 B2
(45) Date of Patent: Oct. 14, 2014

(54) SERVICES CLOUD SYSTEM AND SERVICE REALIZATION METHOD

(75) Inventor: Shijun Zhou, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 247 days.

(21) Appl. No.: 13/519,996

(22) PCT Filed: Apr. 9, 2010

(86) PCT No.: PCT/CN2010/071662
§ 371 (c)(1),
(2), (4) Date: Jun. 29, 2012

(87) PCT Pub. No.: WO2010/148704
PCT Pub. Date: Dec. 29, 2010

(65) Prior Publication Data
US 2012/0317164 A1    Dec. 13, 2012

(30) Foreign Application Priority Data

Dec. 30, 2009    (CN) .......................... 2009 1 0217242

(51) Int. Cl.
*G06F 15/16* (2006.01)
*H04W 4/00* (2009.01)
*H04W 80/12* (2009.01)

(52) U.S. Cl.
CPC .............. *H04W 4/003* (2013.01); *H04L 64/10* (2013.01); *H04W 80/12* (2013.01)
USPC ......................................... 709/201; 709/226

(58) Field of Classification Search
USPC ............................................... 709/201, 226
See application file for complete search history.

(56) References Cited

U.S. PATENT DOCUMENTS

| 7,254,614 | B2* | 8/2007 | Mulligan et al. ............... 709/207 |
| 2004/0185877 | A1 | 9/2004 | Asthana et al. |
| 2004/0190695 | A1* | 9/2004 | Parker ......................... 379/93.23 |
| 2005/0278441 | A1 | 12/2005 | Bond et al. |
| 2006/0072721 | A1* | 4/2006 | Wisniewski ............... 379/88.22 |
| 2006/0168584 | A1 | 7/2006 | Dawson et al. |
| 2006/0190616 | A1* | 8/2006 | Mayerhofer et al. ......... 709/231 |
| 2006/0212539 | A1* | 9/2006 | Palevich et al. ............... 709/217 |

(Continued)

FOREIGN PATENT DOCUMENTS

| CN | 101964742 B | * | 5/2012 | ............. H04L 12/56 |
| EP | 1237380 A2 | * | 9/2002 | ............. H04Q 3/00 |
| KR | 20070059864 A | * | 6/2007 | ............. H04Q 7/24 |
| WO | WO 2009066871 A2 | * | 5/2009 | ............. H04W 4/12 |

OTHER PUBLICATIONS

International Search Report for PCT/CN2010/071662 dated Sep. 20, 2010.

*Primary Examiner* — Kostas Katsikis
(74) *Attorney, Agent, or Firm* — Stephen Yang; Ling Wu; Ling and Yang Intellectual Property (57) ABSTRACT

A services cloud system and a service realization method are provided. In the services cloud system, a service processing module processes a core service logic part of an application service and calls a data processing module. The data processing module calls a tool and algorithm library of an open service logic module to process the service data and stores the results into a distributed file system module. The system and service realization method implement unified service products and save network resources.

15 Claims, 4 Drawing Sheets

(56) References Cited

U.S. PATENT DOCUMENTS

| | | | |
|---|---|---|---|
| 2006/0224628 A1* | 10/2006 | Gupta | 707/104.1 |
| 2006/0227810 A1 | 10/2006 | Childress et al. | |
| 2007/0011261 A1* | 1/2007 | Madams et al. | 709/207 |
| 2007/0061277 A1 | 3/2007 | Boden et al. | |
| 2008/0260139 A1* | 10/2008 | Ruckart et al. | 379/221.01 |
| 2008/0294735 A1* | 11/2008 | Muntermann et al. | 709/206 |
| 2009/0259720 A1* | 10/2009 | Heins et al. | 709/205 |
| 2010/0169351 A1* | 7/2010 | Kulkarni et al. | 707/759 |
| 2012/0136731 A1* | 5/2012 | Kidron et al. | 705/15 |

\* cited by examiner

SERVICES CLOUD SYSTEM AND SERVICE REALIZATION METHOD

TECHNICAL FIELD

The present invention relates to a services cloud system and service realization method, and more particularly, to a services cloud system integrating multiple services and a service realization method based on the services cloud system.

BACKGROUND OF THE RELATED ART

Multimedia Messaging Service (MMS) is a messaging service capable of transmitting multimedia contents between mobile phones and between a mobile phone and other applications such as an E-mail server. The multimedia messaging service is divided according to operators to which users belong and areas in which the users are located, and is provided to the users by multimedia messaging service centers (MMSC) to which the users belong.

Wireless Application Protocol (WAP) is a set of globalized wireless application protocol standards made by the WAP forum. As long as a user uses a mobile terminal with WAP function connected to a WAP gateway, which is connected to Internet, like a desktop user, he can browse network information and enjoy the huge convenience offered by Internet, such as receiving and sending of E-mails, to obtain traffic information, stock information, weather information, news and query phonebooks.

Short Messaging Service (SMS) is the earliest short messaging service and is also a short messaging service with the highest popularization rate. The short messaging service is divided according to operators to which users belong and areas in which the users are located, and is provided to the users by short messaging service centers (SMSC) to which the users belong.

The three services introduced above, the multimedia messaging service, wireless application service and short messaging service, all belong to service products, among which there are many similar products and their implemented functions are different as well. However, networking structures of various products provided by different manufacturers are the same basically, and only service processing procedures are different. Meanwhile, these products are independent basically, that is, each product is networked separately and implements respective function separately, which results in repeated construction and resource waste.

BRIEF SUMMARY OF THE INVENTION

A technical problem to be solved by the present invention is to provide a services cloud system integrating multiple services so as to implement unified service products and save network resources.

In order to solve the described problem, the present invention provides a services cloud system comprising a service processing module, a data processing module, an open service logic module and a distributed file system module, wherein the service processing module is configured to process a core service logic of a application service and call the data processing module to process service data;

the data processing module is configured to call the open service logic module to process the service data when called by the service processing module and send processed results to the distributed file system module for storage;

the open service logic module is configured to perform algorithm support on the service processing module and provide a complete tool and an algorithm library;

the distributed file system module is configured to store, maintain and query a file system and provide interfaces for upper layer modules;

so as to implement integration of multiple services.

The services cloud system further comprises a browser open system module and a resource monitoring and scheduling module, wherein the browser open system module is configured to configure and maintain operation of the service processing module and provide standard Web service interfaces and representational state transfer interfaces on the basis of a WEB2.0 container, which uses a standard JAVA® development mode in the industry to implement distributed deployment and perform user requirements; and the resource monitoring and scheduling module is configured to monitor system resource occupation conditions of the open service logic module service, the data processing module, the service processing module, and the distributed file system module and deploy and schedule service applications according to the occupation conditions.

The service processing module and the open service logic module are deployed on virtual operating systems of each of a plurality of single-boards, wherein there is a plurality of virtual operating systems on each single-board, and each virtual operating system deploys one type of service and has function of the service and bears software operation of the service, and the resource monitoring and scheduling module is configured to perform monitoring and scheduling for each virtual operating system.

The distributed file system module further comprises a metadata control node (FLR), a data storage client (FAC) and a plurality of data storage servers (FAS), wherein the FLR is configured to manage all service data stored by the FAS, write persistent logs and write check points periodically, receive access information of the FAC, return responses, query the FAS based on the access information, and control access of the service data in the FAS;

the FAS is configured to store data, and save data streams sent by the FAC or send data streams to the FAC according to instructions of the FLR; and the FAC is configured to provide interfaces to the service processing module, the open service logic module, the data processing module, the resource monitoring and scheduling module and the browser open system module, receive access requests, access to the FLR, and send data streams to the FAS, or receive data streams sent by the FAS to send to a module sending the access requests.

The interfaces provided by the FAC use standard Portable Operating System Interface of UNIX® (POSIX) protocols.

The FAS is further configured to store the same slice into different FAS of the distributed file system module when storing a file in slices.

The FLR is further configured to use a dual CPU hot-redundancy mechanism.

The data processing module is further configured to provide open interfaces for third party manufactures using standard database query and operational statements and comprises a foreground data processing sub-module and a background data processing sub-module, wherein the foreground data processing sub-module comprises a plurality of memory databases and is configured to process the service data in the memory databases and store the processed results into the distributed file system module; and the background data processing sub-module comprises a plurality of data warehouses and is configured to store massive data using the data warehouses, deploy the data warehouses linearly, and process distributively the massive data in the data warehouses, which is stored in the distributed file system.

The foreground data processing sub-module is configured to determine whether the service data is stored in the memory databases when called by the service processing module, process the service data stored in the memory databases if yes, and obtain the service data from the distribute file system for processing if no.

The open service logic module is comprised of a service logic program (SLP) execution processing container and a development environment of a service logic execution environment (SLEE), wherein the development environment of the SLEE is configured to provide a complete tool and an algorithm library to implement openness to the third party manufacturers; and the SLP execution processing container is configured to provide integration between mobile technologies and enterprise technologies and contain various event-oriented application programs, the application programs including IP telephone service, and distributed interaction simulation, monitoring and control programs.

The service processing module is configured to, according to data requirements of application services, call the foreground data processing sub-module when data quantity of a service is small and call the background data processing sub-module when data quantity of the service is large, the application services including multimedia messaging service, short messaging service, and wireless application protocol (WAP) service.

The resource monitoring and scheduling module comprises a monitoring center and a scheduling center, wherein the monitoring center is configured to monitor warning, configuration and operation conditions of a system and comprises a fault management sub-module, a strategy configuration sub-module and an upgrade management sub-module, wherein the fault management sub-module is configured to manage warning information;

the strategy configuration sub-module is configured to manage configuration information; and the upgrade management sub-module is configured to analyze the operation conditions of the system and make resource adjustment advices;

the scheduling center is configured to schedule calculation, storage and network resources of the system based on information of the monitoring center and comprises a calculation resource management sub-module, a storage resource management sub-module and strategy scheduling sub-module, wherein the calculation resource management sub-module is configured to manage calculation and network resources in a unified way;

the storage resource management sub-module is configured to manage storage resources in a unified way and manage mapping files; and the strategy scheduling sub-module is configured to make resource adjustment advices, manage virtual machine resources and volume resources, manage topology relationship, and manage decentralization and domain partition multi-user information.

The scheduling center is configured to:

obtain traffic load condition of each single-board through the monitoring center, and if finding that a resource occupancy rate of a certain single-board exceeds a set threshold, initiate a handling process of a service of the single-board in which resource occupancy rate exceeds the set threshold on an idle single-board;

perform switching of single-boards to switch a service of a certain single-board where faults occur to an idle single-board according to a warning that the faults occur in the single-board provided by the monitoring center;

when a user uploads a service version to the scheduling center, deploy services according to resource occupancy condition on each single-board and then initiate the services;

when detecting a resource utilization rate of the single-board is lower than the set threshold at night or in a period of time of low traffic, centralize and transfer the services of the single-board to one or more single-boards and release resources of other single-boards;

monitor peak load shifting conditions of different services in services cloud periodically according to the load condition of the single-board and schedule resource distribution to transfer the services from a single-board in which load is higher than the set threshold to a single-board in which load is lower than the set threshold.

In order to solve the problem described above, the present invention further provides a service realization method comprising:

a service processing module processing a core service logic part and calling a data processing module, and the data processing module calling a tool and algorithm library of an open service logic module to process service data and storing results into a distributed file system module;

so as to implement integration of multiple services.

The service processing module, the data processing module, the open service logic module and the distributed file system module are monitored by a resource monitoring and scheduling module, which deploys and schedules service applications according to occupancy conditions of system resources; configuration and operation maintenance of the service processing module is implemented by a browser open system module.

The present invention implements unified service products and saves network resources by integrating various service products, including the multimedia messaging service, short messaging service and WAP service. Since a distributed cloud system is used, quantities of calculation resources, storage resources, network resources and access resources may be increased by linear superposition to enhance processing ability of the system linearly such that the system is more flexible and has dynamic scalability. The distributed cloud system provides standard interfaces externally to facilitate the third party manufacturers to use, thereby enriching traffic characteristics of operators. Further, the distributed cloud system uses a services cloud scheduling method to shield details implemented inside the services cloud, so as to implement intellectualization of scheduling.

DETAILED DESCRIPTION OF THE INVENTION

The technical scheme of the present invention will be described in more detail in conjunction with the accompanying drawings and embodiments.

A services cloud system in accordance with an embodiment of the present invention contains calculation resources, storage resources, network resources and access resources. Quantities of all of the described resources may be increased by linear superposition to enhance processing ability of the system linearly. A core technology for implementing the services cloud system is to provide distributed storage, distributed database and distributed calculation, implement platform therein and provide calling interfaces externally. The services cloud system objectifies the resources described above and forms a comprehensive platform to be conveniently provided to the third party manufacturers to use, thereby enriching traffic characteristics of operators.

A browser open system module in accordance with the embodiment of the present invention configures and maintains operation of a service processing module, which processes core service logic parts of various services, such as multimedia messaging service, short messaging service and WAP service, and calls a data processing module to process service data. The data processing module calls a tool and algorithm library of an open service logic module to process the service data and stores the results into a distributed file system module.

The service processing module, the data processing module, the open service logic module and the distributed file system module are monitored by a resource monitoring and scheduling module, which deploys and schedules service applications according to occupancy conditions of system resources; configuration and operation maintenance of the service processing module is implemented by a browser open system module.

Figure 1:
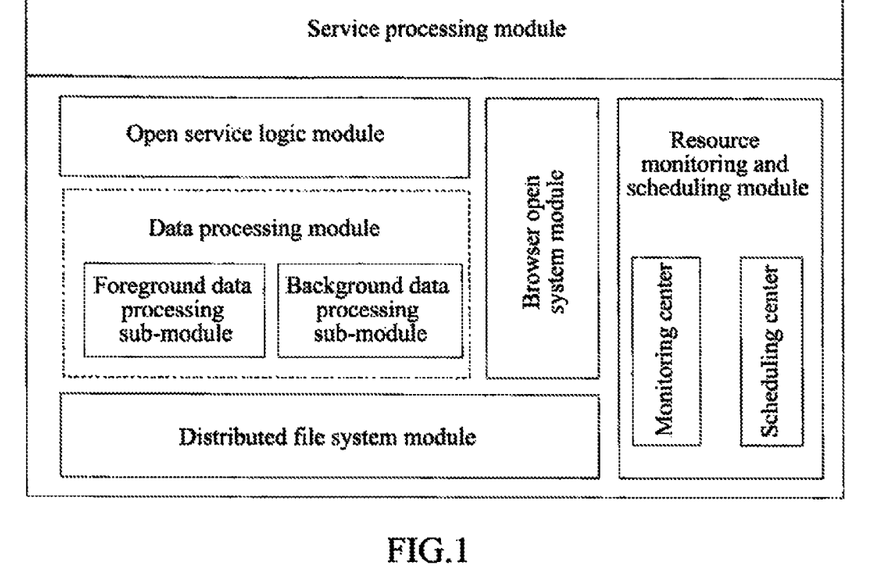
FIG. 1 is a block diagram of a services cloud system in accordance with the present invention.

A block diagram of a services cloud system in accordance with the embodiment of the present invention, which comprises a service processing module, an open service logic module, a data processing module and a distributed file system module, is shown in FIG. 1.

The service processing module is configured to process a core service logic of a application service and call the data processing module to process service data.

The open service logic module is configured to perform algorithm support on the service processing module and provide a complete tool and an algorithm library.

The data processing module is configured to call the open service logic module to process the service data when called by the service processing module and send the processed results to the distributed file system module for storage.

The distributed file system module is configured to store, maintain and query a file system and provide interfaces for upper layer modules.

The services cloud system in accordance with the present invention further comprises a browser open system module and a resource monitoring and scheduling module.

Figure 2:
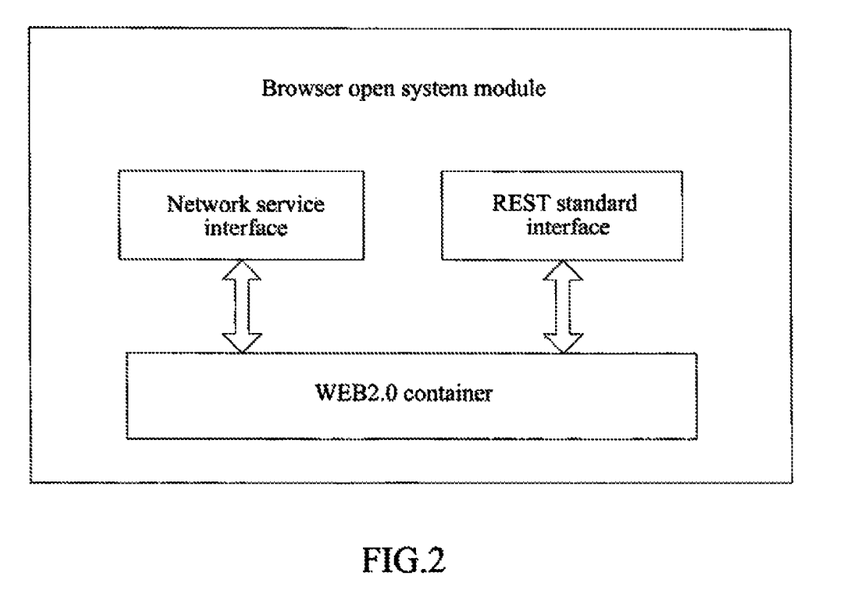
FIG. 2 is a block diagram of a browser open system module in accordance with the present invention.

The browser open system module is configured to provide standard Web service interfaces and representational state transfer (REST) standard interfaces on the basis of a WEB2.0 container to implement configuration and operation maintenance of the service processing module. The WEB2.0 container uses a standard JAVA® development mode in the industry to implement distributed deployment and perform user requirements. The block diagram of the browser open system module is shown in FIG. 2.

The resource monitoring and scheduling module is configured to monitor system resource occupation conditions of the open service logic module, the data processing module, the service processing module, and the distributed file system module and deploy and schedule service applications according to the occupation conditions.

The service processing module in accordance with the embodiment of the present invention processes application services, including the multimedia messaging service, short messaging service, WAP service and the like, and according to data requirements of the application services, calls the foreground data processing sub-module when data quantity is small and calls the background data processing sub-module when data quantity is large.

Figure 3:
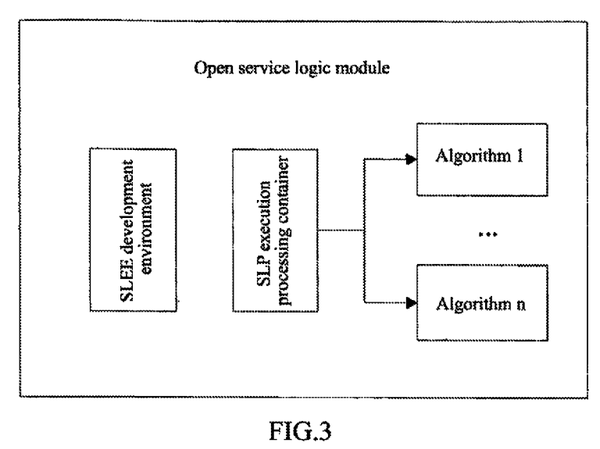
FIG. 3 is a block diagram of an open service logic module in accordance with the present invention.

The open service logic module in accordance with the embodiment of the present invention is shown in FIG. 3 and is further comprised of a service logic program (SLP) execution processing container and a development environment of a service logic execution environment (SLEE).

The development environment of the SLEE is configured to provide a complete tool and algorithm library to implement openness to the third party manufacturers.

The SLP execution processing container provides integration between mobile technologies and enterprise technologies and contains various event-oriented application programs, such as IP telephone service, and distributed interaction simulation, monitoring and control programs.

The data processing module provides open interfaces for third party manufactures using standard database query and operational statements, e.g., provide SQL open interfaces using standard SQL language, and comprises a foreground data processing sub-module and a background data processing sub-module.

Figure 4:
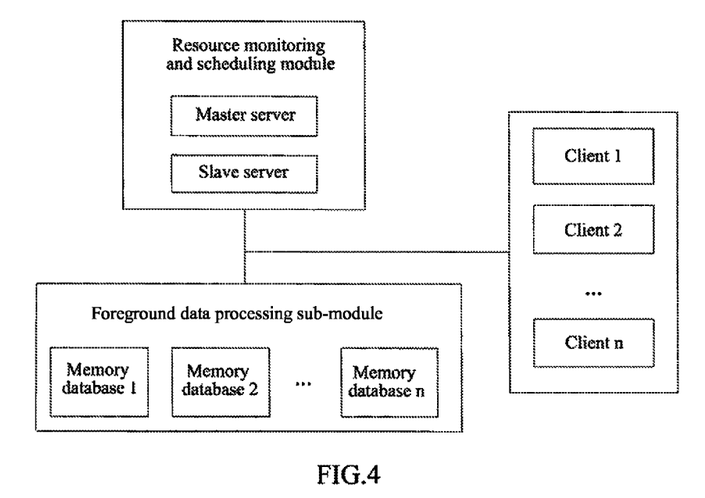
FIG. 4 is a block diagram of a foreground service processing module in accordance with the present invention.

The foreground data processing sub-module shown in FIG. 4 comprises a plurality of memory databases and is configured to process the service data in the memory databases and store the processed results into the distributed file system module.

The foreground data processing sub-module determines whether the service data is stored in the memory databases when called by the service processing module, processes by adopting the service data stored in the memory databases if yes, and obtains the service data from the distribute file system module for processing if no. Deployment of the service data in the memory databases is scheduled by the resource monitoring and scheduling module.

Figure 5:
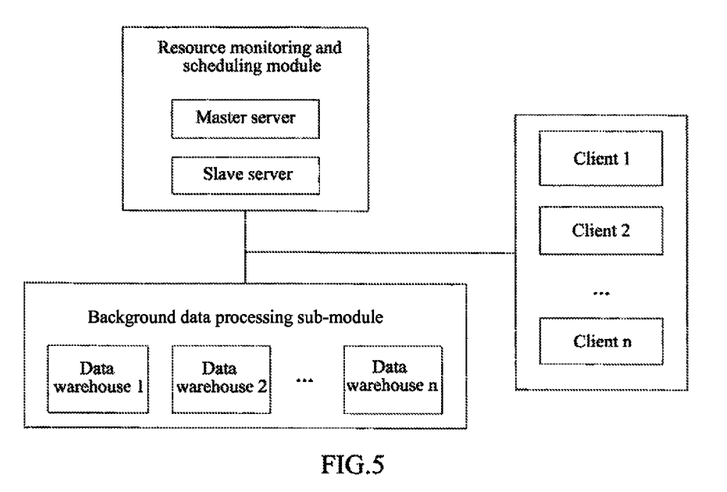
FIG. 5 is a block diagram of a background service processing module in accordance with the present invention.

The background data processing sub-module shown in FIG. 5 comprises a plurality of data warehouses and is configured to store massive data using the data warehouses, deploy the data warehouses linearly, and process distributively the massive data in the data warehouses, which is stored in the distributed file system.

When called, the data processing module exchanges control information with a client (the open service logic module and the service processing module) through the resource monitoring and scheduling module. It exchanges only data streams with the client.

Figure 6:
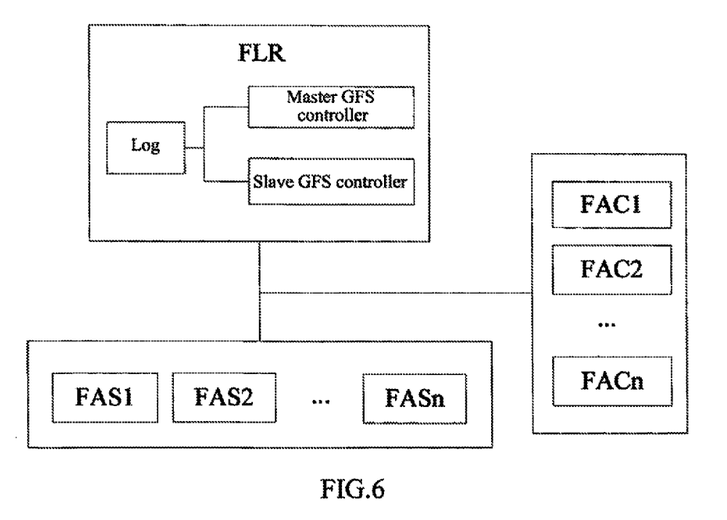
FIG. 6 is a block diagram of a distributed file system module in accordance with the present invention.

A distributed file system module in accordance with the embodiment of the present invention is shown in FIG. 6 and further comprises a metadata control node (FLR), a data storage client (FAC) and a plurality of data storage servers (FAS).

The FLR is configured to manage all service data stored by the FAS, write persistent logs and write check points periodically, receive access information of the FAC, return responses, query the FAS based on the access information, and control access of the service data in the FAS. The FLR uses a dual CPU hot-redundancy mechanism.

The FAS is configured to store data, and save data streams sent by the FAC or send data streams to the FAC according to instructions of the FLR. When the FAS stores a file in slices, the size of a typical slice is 64 MB, and the same slice is stored into different FAS of the distributed file system module respectively.

The storing mode may be to store a complete copy of all the slices of the file into different FAS respectively or to store the slices of the file into different FAS respectively according to certain algorithms, such as data redundancy algorithm.

The FAC is configured to provide interfaces to the service processing module, the open service logic module, the data processing module, the background data processing sub-module, the resource monitoring and scheduling module and the browser open system module, access to the FLR after receiving access requests, and send data streams to the FAS, or receive data streams sent by the FAS and then send to a module sending the access requests. The interfaces provided by the FAC use standard Portable Operating System Interface of UNIX® (POSIX) protocols to support the above modules' calling for the FAC.

The resource monitoring and scheduling module in accordance with the embodiment of the present invention further comprises a monitoring center and a scheduling center.

The monitoring center is configured to monitor warning, configuration and operation conditions of a system and comprises a fault management sub-module, a strategy configuration sub-module and an upgrade management sub-module.

The fault management sub-module is configured to manage warning information.

The strategy configuration sub-module is configured to manage configuration information.

The upgrade management sub-module is configured to analyze the operation conditions of the system and make resource adjustment advices.

The scheduling center is configured to schedule calculation, storage and network resources of the system based on information of the monitoring center and comprises a calculation resource management sub-module, a storage resource management sub-module and strategy scheduling sub-module.

The calculation resource management sub-module is configured to manage calculation and network resources in a unified way.

The storage resource management sub-module is configured to manage storage resources in a unified way and manage mapping files.

The strategy scheduling sub-module is configured to make resource adjustment advices, manage virtual machine resources and volume resources, manage topology relationship, and manage decentralization and domain partition multi-user information.

The resource monitoring and scheduling module schedules services according to following methods in the case of overload, fault self-recovery, new service deployment, resource dormancy and resource switching.

Figure 7:
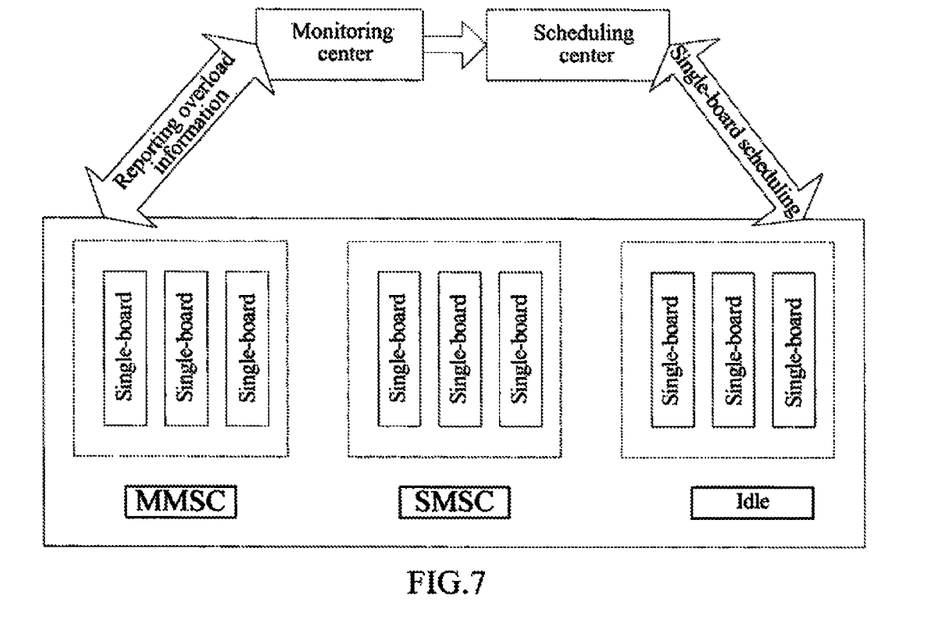
FIG. 7 is a schematic diagram of service scheduling of system overload in accordance with an embodiment of the present invention.

Overload: as shown in FIG. 7, the monitoring center monitors service load condition of each single-board, such as CPU and memory occupancy rate. The single-board has the function of a certain service and bearing software operation of the service. If the monitoring center finds that the resource occupancy rate of a certain single-board exceeds a set threshold, such as 70%, then it believes that the load is too large and reports this to the scheduling center, which initiates a handling process of a service of the single-board in which resource occupancy rate exceeds the set threshold on an idle single-board. By Idle mean that the resource occupancy rate of the single-board is lower than 30%.

Figure 8:
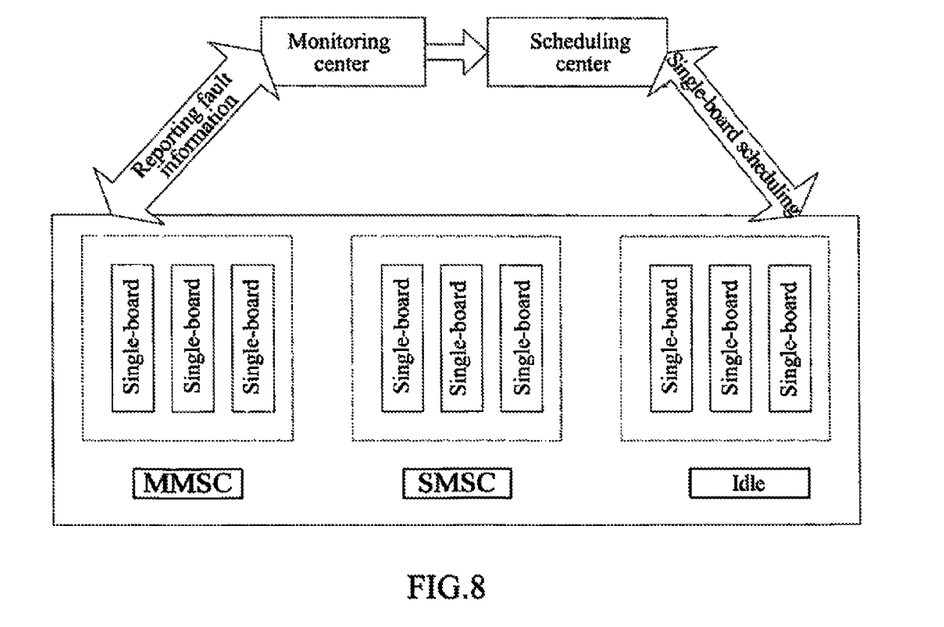
FIG. 8 is a schematic diagram of service scheduling of system fault self-recovery in accordance with an embodiment of the present invention.

Fault self-recovery: as shown in FIG. 8, the monitoring center manages warning information of each single-board, and provides the warning information to the monitoring center when a warning occurs in a single-board. The monitoring center switches the service of the single-board in which the warning occurs to an idle single-board.

New service deployment: when a user uploads a service version to the scheduling center, the scheduling center deploys services according to resource occupancy condition on each single-board and then initiates the services.

Resource dormancy: when the resource scheduling center detects the resource occupancy rate of the single-board is lower than the set threshold, such as 30%, at night or in a period of time of low traffic, it transfers the service of the single-board centrally to one or more single-boards and release resources of other single-boards.

Resource switching: the scheduling center monitors peak load shifting conditions of different services in services cloud periodically according to the load condition of the single-board and schedules resource distribution to transfer the services from a single-board in which load is higher than the set threshold to a single-board in which load is lower than the set threshold.

The service processing module and the open service logic module are deployed on virtual operating systems of each of a plurality of single-boards in accordance with the implements of the invention, wherein there is a plurality of virtual operating systems on each single-board, and each virtual operating system deploys one type of service and has function of the service and bears software operation of the service, and the resource monitoring and scheduling module is configured to perform monitoring and scheduling for each virtual operating system to implement the distributed cloud calculation.

INDUSTRIAL APPLICABILITY

The present invention implements unified service products and saves network resources by integrating various service products, including the multimedia messaging service, short messaging service and WAP service. Since a distributed cloud system is used, quantities of calculation resources, storage resources, network resources and access resources may be increased by linear superposition to enhance processing ability of the system linearly such that the system is more flexible and has dynamic scalability. The distributed cloud system provides standard interfaces externally to facilitate the third party manufacturers to use, thereby enriching traffic characteristics of operators. Further, the distributed cloud system uses a services cloud scheduling method to shield details implemented inside the services cloud, so as to implement intellectualization of scheduling.

I claim:

1. A services cloud system, comprising:
at least one processor, and at least one storage device storing processor executable programs that when executed by the processor cause the processor to perform the steps in a service processing module, wherein the service processing module is configured to process a core service logic of an application service and call a data processing module to process service data;

the system further comprising the data processing module, an open service logic module and a distributed file system module, wherein the data processing module is configured to call the open service logic module to process the service data when called by the service processing module and send processed results to the distributed file system module for storage;

the open service logic module is configured to perform algorithm support on the service processing module and provide a complete tool and an algorithm library;

the distributed file system module is configured to store, maintain and query a file system and provide interfaces for upper layer modules;

so as to implement integration of multiple services;

wherein the data processing module is further configured to provide open interfaces for third party manufactures using standard database query and operational statements and comprises a foreground data processing sub-module and a background data processing sub-module; and wherein the foreground data processing sub-module comprises a plurality of memory databases and is configured to process the service data in the memory databases and store the processed results into the distributed file system module;

the background data processing sub-module comprises a plurality of data warehouses and is configured to store massive data using the data warehouses, deploy the data warehouses linearly, and process distributively the massive data in the data warehouses, which is stored in the distributed file system.

2. The services cloud system according to claim 1, further comprising a browser open system module and a resource monitoring and scheduling module, wherein the browser open system module is configured to configure and maintain operation of the service processing module and provide standard Web service (Webservice) interfaces and representational state transfer (REST) standard interfaces on the basis of a WEB2.0 container, which implements distributed deployment and performs user requirements;

the resource monitoring and scheduling module is configured to monitor system resource occupation conditions of the open service logic module service, the data processing module, the service processing module, and the distributed file system module and deploy and schedule service applications according to the occupation conditions.

3. The services cloud system according to claim 1, wherein the service processing module and the open service logic module are deployed on virtual operating systems of each of a plurality of single-boards, wherein there is a plurality of virtual operating systems on each single-board, and each virtual operating system deploys one type of service and has function of the service and bears software operation of the service, and the resource monitoring and scheduling module is configured to perform monitoring and scheduling for each virtual operating system.

4. The services cloud system according to claim 1, wherein the distributed file system module further comprises a meta-data control node (FLR), a data storage client (FAC) and a plurality of data storage servers (FAS), wherein the FLR is configured to manage all service data stored by the FAS, write persistent logs and write check points periodically, receive access information of the FAC, return responses, query the FAS based on the access information, and control access of the service data in the FAS;

the FAS is configured to store data, and save data streams sent by the FAC or send data streams to the FAC according to instructions of the FLR;

the FAC is configured to provide interfaces to the service processing module, the open service logic module, the data processing module, the resource monitoring and scheduling module and the browser open system module, receive access requests, access to the FLR, and send data streams to the FAS, or receive data streams sent by the FAS to send to a module sending the access requests.

5. The services cloud system according to claim 4, wherein the interfaces provided by the FAC use standard Portable Operating System Interface of UNIX® (POSIX) protocols;

the FAS is further configured to store a same slice into different FAS of the distributed file system module when storing a file in slices;

the FLR is further configured to use a dual CPU hot-redundancy mechanism.

6. The services cloud system according to claim 1, wherein the service processing module is configured to, according to data requirements of application services, call the foreground data processing sub-module when data quantity of a service is small and call the background data processing sub-module when data quantity of the service is large, the application services including multimedia messaging service, short messaging service, and wireless application protocol (WAP) service.

7. The services cloud system according to claim 1, wherein the foreground data processing sub-module is configured to determine whether the service data is stored in the memory databases when called by the service processing module, process the service data stored in the memory databases if yes, and obtain the service data from the distribute file system module for processing if no.

8. The services cloud system according to claim 1, wherein the open service logic module is comprised of a service logic program (SLP) execution processing container and a development environment of a service logic execution environment (SLEE), the development environment of the SLEE is configured to provide a complete tool and an algorithm library to implement openness to the third party manufacturers;

the SLP execution processing container is configured to provide integration between mobile technologies and enterprise technologies and contain various event-oriented application programs, the application programs including IP telephone service, and distributed interaction simulation, monitoring and control programs.

9. The services cloud system according to claim 2, wherein the service processing module and the open service logic module are deployed on virtual operating systems of each of a plurality of single-boards, wherein there is a plurality of virtual operating systems on each single-board, and each virtual operating system deploys one type of service and has function of the service and bears software operation of the service, and the resource monitoring and scheduling module is configured to perform monitoring and scheduling for each virtual operating system.

10. The services cloud system according to claim 2, wherein the resource monitoring and scheduling module comprises a monitoring center and a scheduling center, and wherein the monitoring center is configured to monitor warning, configuration and operation conditions of the system and comprises a fault management sub-module, a strategy configuration sub-module and an upgrade management sub-module, wherein the fault management sub-module is configured to manage warning information;

the strategy configuration sub-module is configured to manage configuration information;

the upgrade management sub-module is configured to analyze the operation conditions of the system and make resource adjustment advices;

the scheduling center is configured to schedule calculation, storage and network resources of the system based on information of the monitoring center and comprises a calculation resource management sub-module, a storage resource management sub-module and strategy scheduling sub-module, wherein the calculation resource management sub-module is configured to manage calculation and network resources in a unified way;

the storage resource management sub-module is configured to manage storage resources in a unified way and manage mapping files;

the strategy scheduling sub-module is configured to make resource adjustment advices, manage virtual machine resources and volume resources, manage topology relationship, and manage decentralization and domain partition multi-user information.

11. The services cloud system according to claim 10, wherein the scheduling center is configured to:

obtain traffic load condition of each single-board through the monitoring center, and if finding that a resource occupancy rate of a certain single-board exceeds a set threshold, initiate a handling process of a service of the single-board in which resource occupancy rate exceeds the set threshold on an idle single-board;

perform switching of single-boards to switch a service of a certain single-board where a fault occur to an idle single-board according to a warning that the fault occur in the single-board provided by the monitoring center;

when a user uploads a service version to the scheduling center, deploy services according to resource occupancy condition on each single-board and then initiate the services;

when detecting a resource utilization rate of the single-board is lower than the set threshold at night or in a period of time of low traffic, transfer the services of the single-board centrally to one or more single-boards and release resources of other single-boards;

monitor peak load shifting conditions of different services in services cloud periodically according to the load condition of the single-board and schedule resource distribution to transfer the services from a single-board in which load is higher than the set threshold to a single-board in which load is lower than the set threshold.

12. The services cloud system according to claim 2, wherein the distributed file system module further comprises a metadata control node (FLR), a data storage client (FAC) and a plurality of data storage servers (FAS), wherein the FLR is configured to manage all service data stored by the FAS, write persistent logs and write check points periodically, receive access information of the FAC, return responses, query the FAS based on the access information, and control access of the service data in the FAS;

the FAS is configured to store data, and save data streams sent by the FAC or send data streams to the FAC according to instructions of the FLR;

the FAC is configured to provide interfaces to the service processing module, the open service logic module, the data processing module, the resource monitoring and scheduling module and the browser open system module, receive access requests, access to the FLR, and send data streams to the FAS, or receive data streams sent by the FAS to send to a module sending the access requests.

13. The services cloud system according to claim 12, wherein the interfaces provided by the FAC use standard Portable Operating System Interface of Unix (POSIX) protocols;

the FAS is further configured to store a same slice into different FAS of the distributed file system module when storing a file in slices;

the FLR is further configured to use a dual CPU hot-redundancy mechanism.

14. A service realization method, comprising:

a service processing module processing a core service logic part and calling a data processing module, and the data processing module calling a tool and algorithm library of an open service logic module to process service data and storing results into a distributed file system module;

so as to implement integration of multiple services;

wherein the data processing module provides open interfaces for third party manufactures using standard database query and operational statements and comprises a foreground data processing sub-module and a background data processing sub-module; and wherein the foreground data processing sub-module comprises a plurality of memory databases and processes the service data in the memory databases and stores the processed results into the distributed file system module;

the background data processing sub-module comprises a plurality of data warehouses and stores massive data using the data warehouses, deploys the data warehouses linearly, and processes distributively the massive data in the data warehouses, which is stored in the distributed file system.

15. The service realization method according to claim 14, wherein, the method further comprises:

the service processing module, the data processing module, the open service logic module and the distributed file system module are monitored by a resource monitoring and scheduling module, which deploys and schedules service applications according to occupancy conditions of system resources; configuration and operation maintenance of the service processing module is implemented by a browser open system module.

\* \* \* \* \*